United States Patent
Kuno et al.

(10) Patent No.: US 8,970,914 B2
(45) Date of Patent: Mar. 3, 2015

(54) IMAGE READING DEVICE CAPABLE OF DETECTING ABNORMAL PIXELS IN WHITE REFERENCE DATA

(71) Applicants: Takeshi Kuno, Nagoya (JP); Kentaro Sugiyama, Gifu (JP)

(72) Inventors: Takeshi Kuno, Nagoya (JP); Kentaro Sugiyama, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 158 days.

(21) Appl. No.: 13/747,966

(22) Filed: Jan. 23, 2013

(65) Prior Publication Data

US 2013/0194638 A1 Aug. 1, 2013

(30) Foreign Application Priority Data

Jan. 31, 2012 (JP) ................................ 2012-018887

(51) Int. Cl.
*H04N 1/00* (2006.01)
*H04N 1/407* (2006.01)

(52) U.S. Cl.
CPC ......... *H04N 1/0087* (2013.01); *H04N 1/00013* (2013.01); *H04N 1/00031* (2013.01); *H04N 1/00045* (2013.01); *H04N 1/4076* (2013.01)
USPC ........................... 358/406; 358/461; 358/463

(58) Field of Classification Search
None
See application file for complete search history.

(56) References Cited

U.S. PATENT DOCUMENTS

| 6,996,289 B1 | 2/2006 | Tsutamori et al. |
| 8,804,013 B2 * | 8/2014 | Park et al. ..................... 382/274 |
| 2002/0089707 A1 * | 7/2002 | Yasuda ......................... 358/518 |
| 2011/0181921 A1 * | 7/2011 | Fukutome et al. ............ 358/474 |

FOREIGN PATENT DOCUMENTS

| JP | 2001-186341 A | 7/2001 |
| JP | 2004-320817 A | 11/2004 |
| JP | 2006-013833 A | 1/2006 |
| JP | 2007-267079 A | 10/2007 |
| JP | 2010-246125 A | 10/2010 |
| JP | 2011-155535 A | 8/2011 |

OTHER PUBLICATIONS

Notification of First Office Action dated Dec. 12, 2014 received from the Chinese Patent Office in related application CN 201310039555.2.

* cited by examiner

*Primary Examiner* — Kimberly A Williams
(74) *Attorney, Agent, or Firm* — Scully, Scott, Murphy & Presser, PC

(57) ABSTRACT

An image reading device includes a white reference member, reading device, and processor. The reading device includes lenses and light-receiving elements. The light-receiving elements output a plurality of pixel values based on a light reflected from the white reference member. Each lens corresponds to at least two light-receiving elements. Each light-receiving element is configured to receive a light reflected from the white reference member and passing through the corresponding lens and to output one pixel value. The processor acquires the pixel values by using the reading device, sets a target pixel, and determines that the target pixel is an abnormal pixel when an absolute value of difference between a pixel value of the target pixel and a pixel value of a first pixel is greater than a prescribed threshold. The first pixel is separated from the target pixel by an integer multiple of the predetermined lens-to-lens distance.

8 Claims, 9 Drawing Sheets

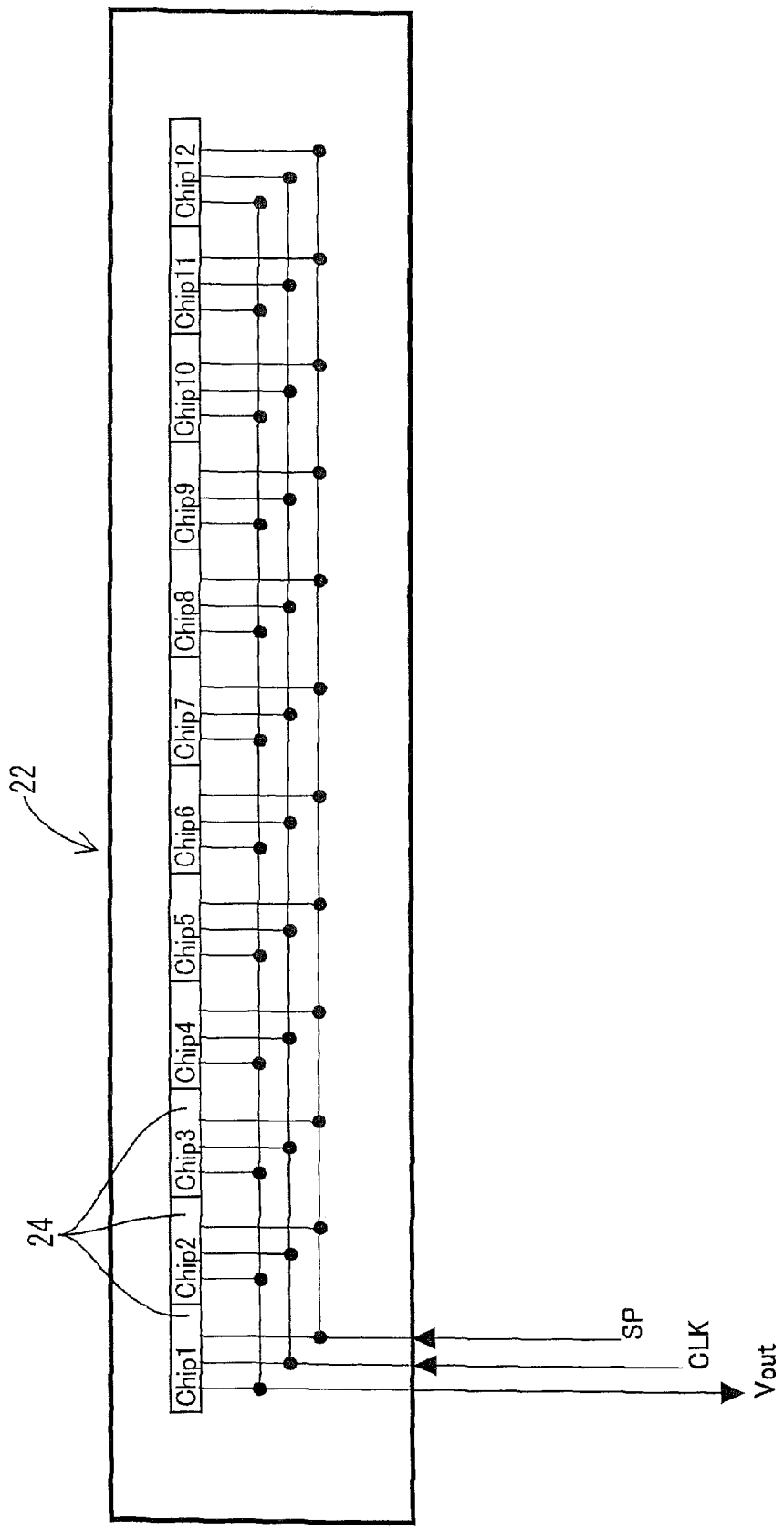

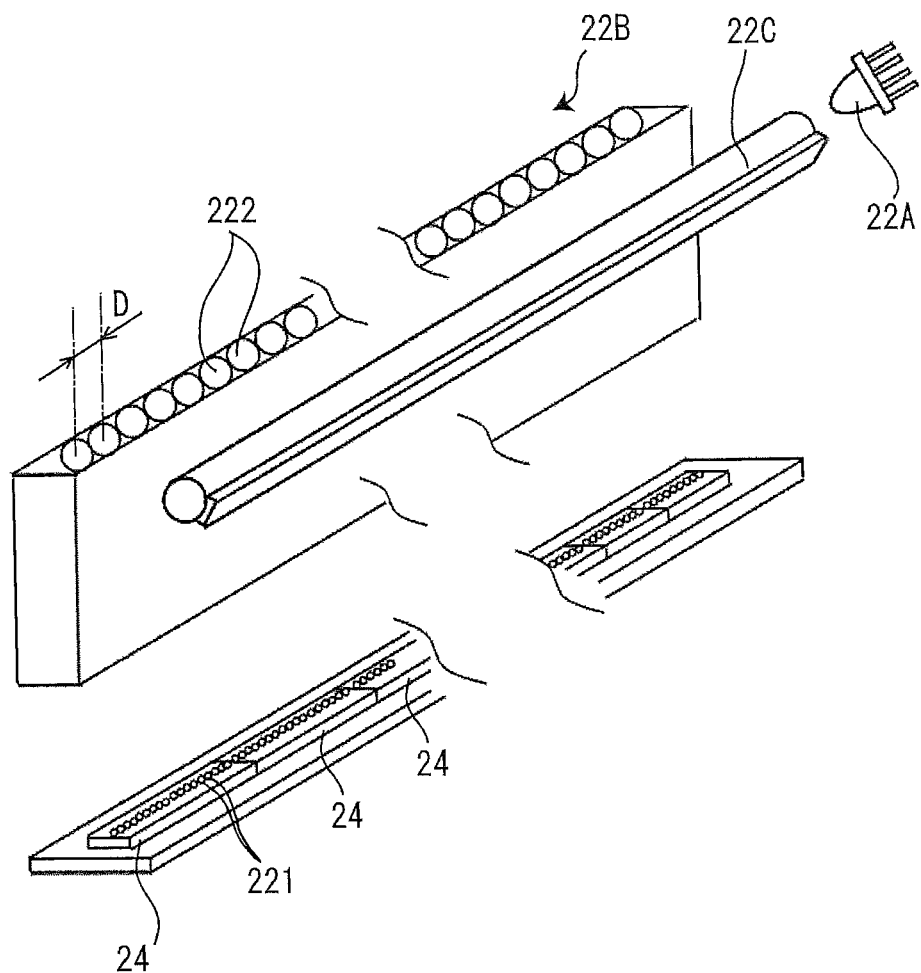

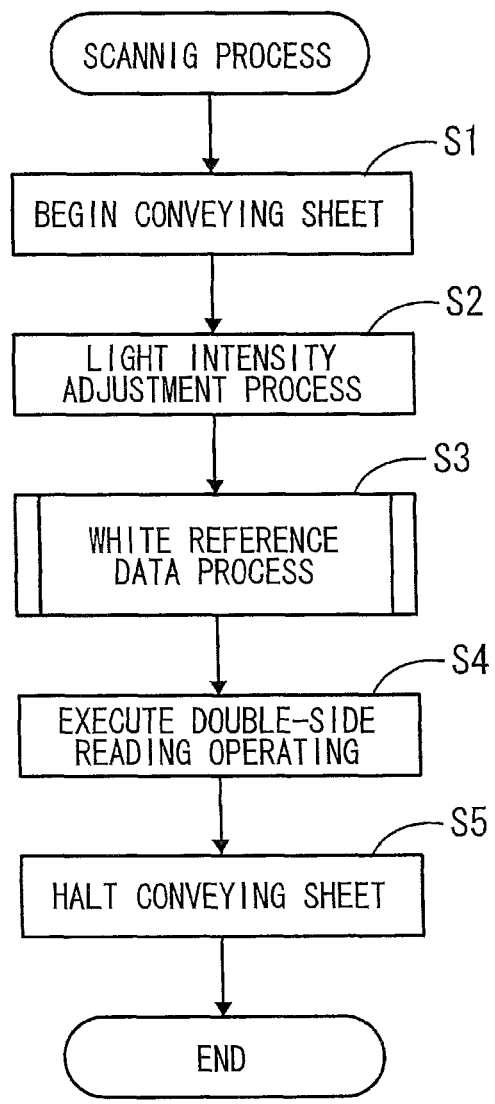

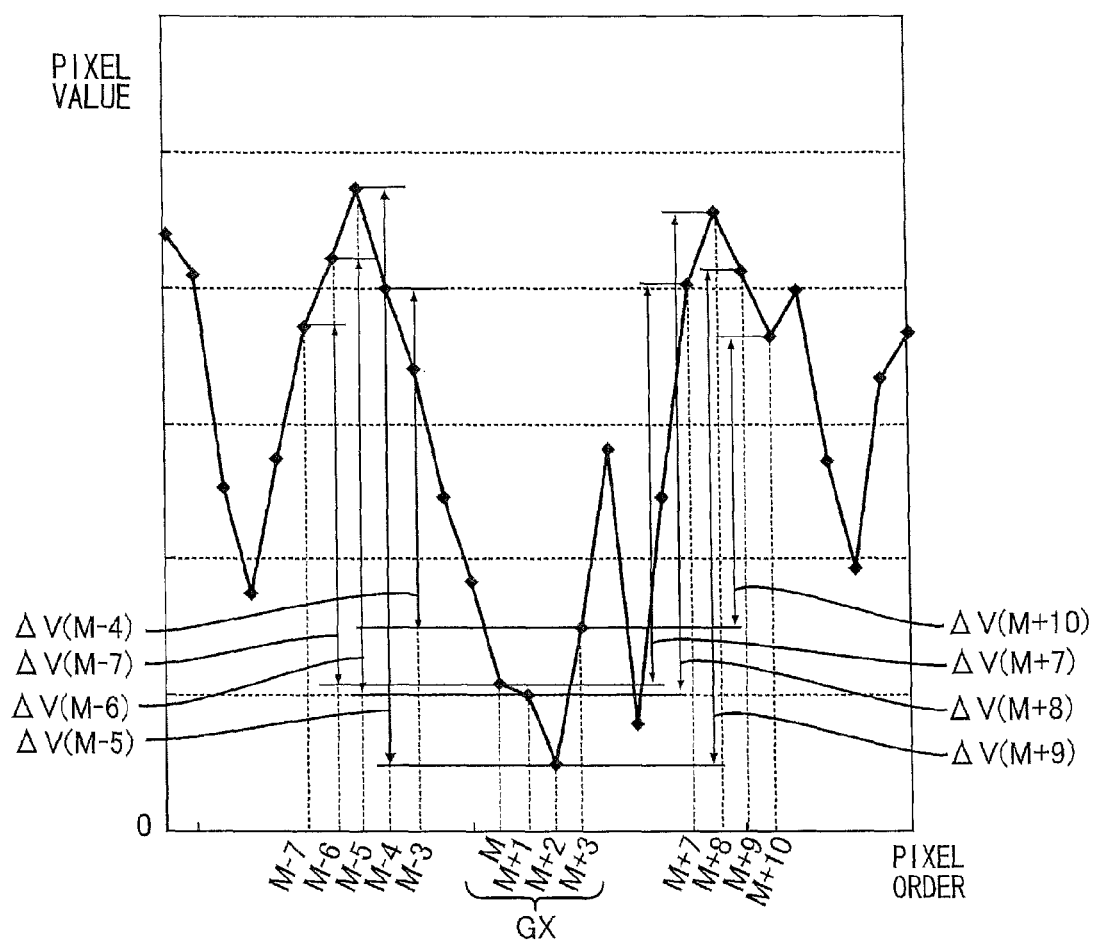

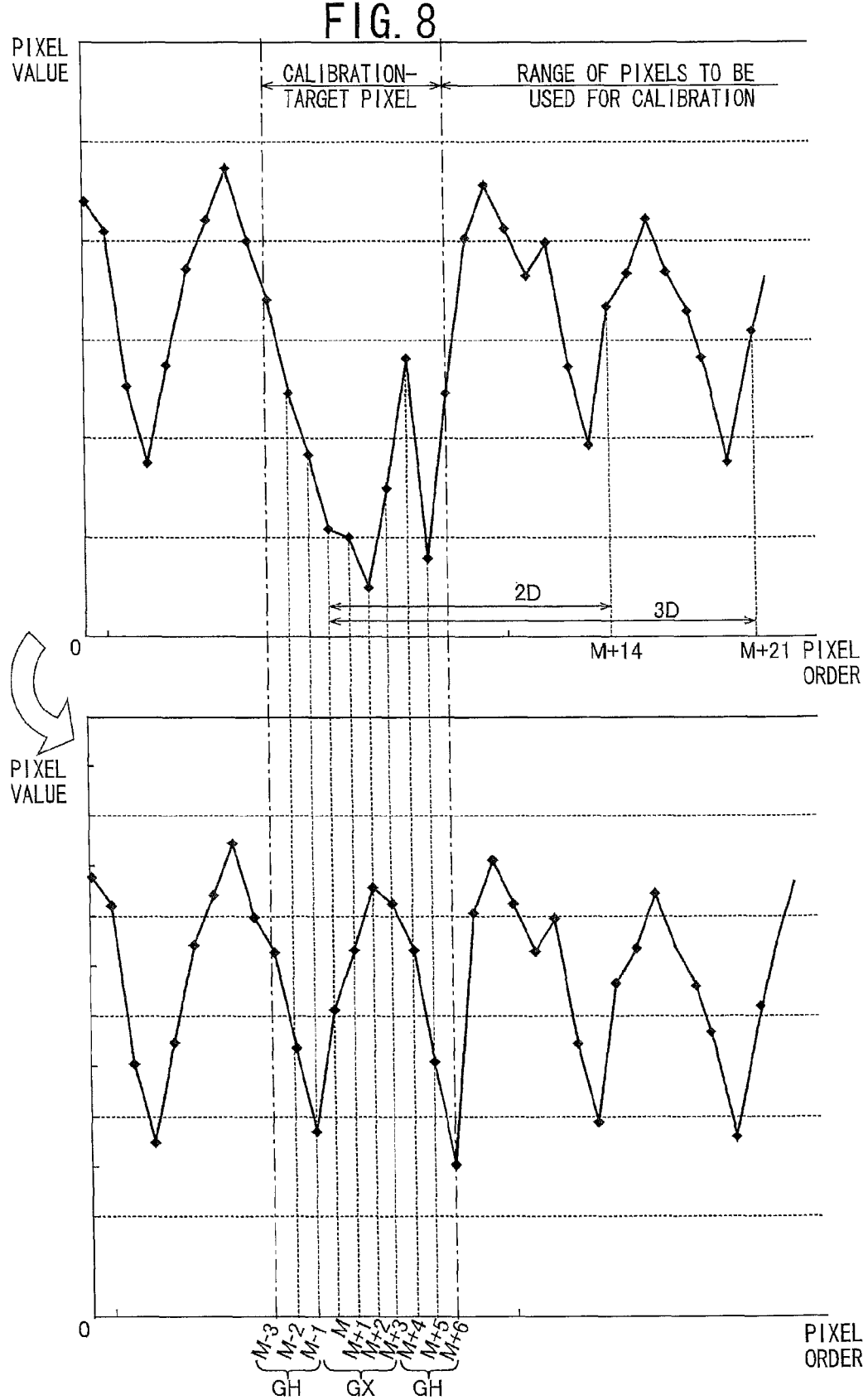

IMAGE READING DEVICE CAPABLE OF DETECTING ABNORMAL PIXELS IN WHITE REFERENCE DATA

CROSS REFERENCE TO RELATED APPLICATION

This application claims priority from Japanese Patent Application No. 2012-018887 filed Jan. 31, 2012. The entire content of the priority application is incorporated herein by reference.

TECHNICAL FIELD

The present invention relates to an image reading device for detecting abnormal pixels in white reference data used for shading compensation.

BACKGROUND

Many scanning devices are configured of a plurality of lenses of uniform diameter juxtaposed linearly, and a plurality of light-receiving elements aligned in the same direction. In a scanning device configured with a plurality of lenses, pixel values for a row of pixels change in regular periods corresponding to the spacing of the lenses due to the focusing properties of the lenses. Hence, white reference data acquired by this type of scanning device does not change linearly, but rather cyclically in intervals corresponding to the lens spacing.

SUMMARY

An image-reading device having this type of scanning device may perform a process for detecting abnormal pixels in white reference data, but it is difficult for the image-reading device to distinguish (1) abnormal pixels having different values than neighboring pixels due to the presence of foreign matter from (2) abnormal pixels having different values than neighboring pixels due to periodic changes corresponding to the lens spacing. In other words, since the conventional reading device does not consider periodic changes in white reference data corresponding to the lens spacing, pixels reflecting such periodic changes may be incorrectly judged to be abnormal.

Therefore, it is an object of the present invention to provide an image reading device capable of detecting abnormal pixels in white reference data while suppressing the effects of periodic changes in pixel values corresponding to lens spacing that is inherent in white reference data.

In order to attain the above and other objects, the invention provides an image reading device. The image reading device includes a white reference member, a reading device, and a processor. The reading device includes a plurality of lenses and a plurality of light-receiving elements. The plurality of lenses is arranged in a predetermined direction at a predetermined lens-to-lens distance. Each of the plurality of lenses has a predetermined diameter. The plurality of light-receiving elements is arranged in the predetermined direction. The plurality of light-receiving elements is configured to output white reference data including a plurality of pixel values for a plurality of pixels based on a light reflected from the white reference member. Each of the plurality of lenses corresponds to at least two of the plurality of light-receiving elements. Each of the plurality of light-receiving elements is configured to receive a light reflected from the white reference member and passing through the corresponding lens and to output one of the plurality pixel values based on the received reflected light. The processor is configured to: acquire the white reference data by using the reading device; set each of the plurality of pixels as a target pixel; and determine that the target pixel is an abnormal pixel when an absolute value of difference between a pixel value of the target pixel and a pixel value of a first pixel is greater than a prescribed threshold. The first pixel corresponds to a light-receiving element that is separated from a light-receiving element corresponding to the target pixel by an integer multiple of the predetermined lens-to-lens distance.

According to another aspect, the present invention provides a non-transitory computer readable storage medium storing a set of program instructions installed on and executed by a computer. The program instructions includes: acquiring white reference data outputted by a plurality of light-receiving elements of a reading device, the reading device including a plurality of lenses and a plurality of light-receiving elements, the plurality of lenses being arranged in a predetermined direction at a predetermined lens-to-lens distance, each of the plurality of lenses having a predetermined diameter, the plurality of light-receiving elements being arranged in the predetermined direction, the white reference data including a plurality of pixel values for a plurality of pixels based on a light reflected from a white reference member, each of the plurality of lenses corresponding to at least two of the plurality of light-receiving elements, each of the plurality of light-receiving elements being configured to receive a light reflected from the white reference member and passing through the corresponding lens and to output one of the plurality pixel values based on the received reflected light; setting each of the plurality of pixels as a target pixel; and determining that the target pixel is an abnormal pixel when an absolute value of difference between a pixel value of the target pixel and a pixel value of a first pixel is greater than a prescribed threshold, the first pixel corresponding to a light-receiving element that is separated from a light-receiving element corresponding to the target pixel by an integer multiple of the predetermined lens-to-lens distance.

BRIEF DESCRIPTION OF THE DRAWINGS

The particular features and advantages of the invention as well as other objects will become apparent from the following description taken in connection with the accompanying drawings, in which:

FIG. 3A is a schematic view of reading device of the scanning unit shown in FIG. 2;

FIG. 3B is a perspective view of the reading device of the scanning unit shown in FIG. 2;

FIG. 4 is a flowchart illustrating steps in a scanning process executed by the image reading device;

FIG. 7 is a graph showing relationships between pixel values including four abnormal pixels in white reference data and positions of pixels; and FIG. 8 is an explanatory diagram showing the white reference data and a graph showing a calibrated white reference data.

DETAILED DESCRIPTION

Electrical Structure of the MFP

Figure 1:
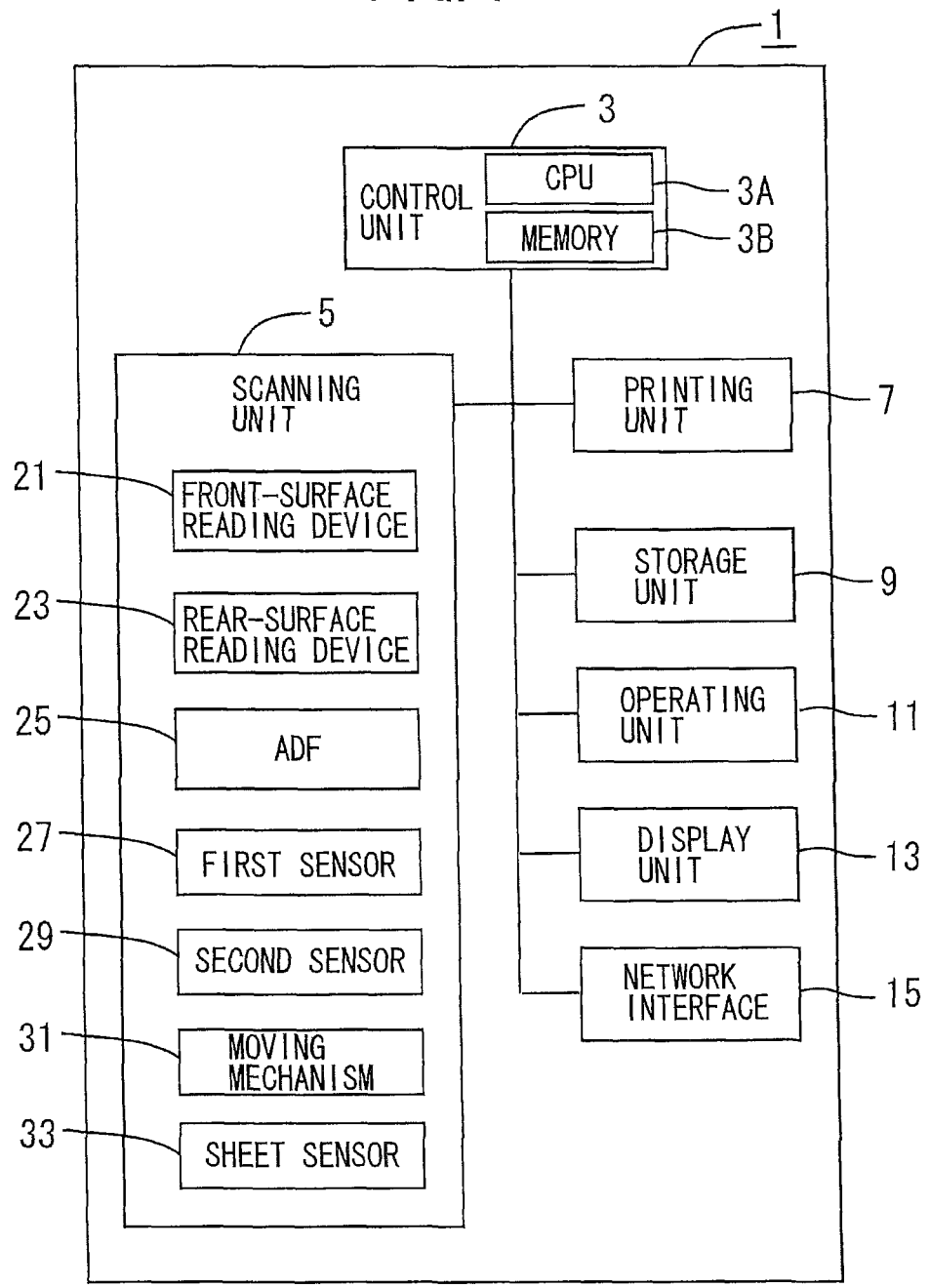
FIG. 1 is a block diagram showing an image reading device according to an embodiment of the present invention.

As shown in FIG. 1, the MFP 1 includes a control unit 3, a scanning unit 5, a printing unit 7, a storage unit 9, an operating unit 11, a display unit 13, and a network interface 15.

The control unit 3 has a CPU 3A and a memory 3B. The memory 3B stores programs for executing various operations on the MFP 1 including a program for executing a scanning operation described later. The CPU 3A controls each component of the MFP 1 based on the programs read from the memory 3B. The memory 3B includes both RAM and ROM. However, a medium other than RAM or RAM may be used for storing the various programs, such as a CD-ROM, hard disk drive, flash memory (registered trademark), or other nonvolatile memory.

The scanning unit 5 reads an image from a sheet of original M and generates scan data denoting rows of pixels that correspond to the scanned image. The scanning unit 5 includes a front-surface reading device 21, a back-surface reading device 23 serving as an example of reading device, an automatic document feeder (hereinafter "ADF") 25, a first sensor 27, a second sensor 29, a moving mechanism 31, and a sheet sensor 33. The structure of the scanning unit 5 will be described later in greater detail.

The printing unit 7 prints color or monochrome images on sheets using an electrophotographic system or an inkjet system, for example, based on the scan data or other image data. The storage unit 9 is configured of a nonvolatile memory, such as NVRAM, flash ROM, or a hard disk drive, and serves to store the scan data and the like. The operating unit 11 includes a plurality of buttons that the user can operate to input various information. The display unit 13 has a liquid crystal display, lamps, and the like for displaying various option menus and indicating the operating status of the device. The network interface 15 connects the MFP 1 to an external device, such as a personal computer (not shown), via a network (not shown) and can implement data communications with the external device.

Detailed Structure of the Scanning Unit

Figure 2:
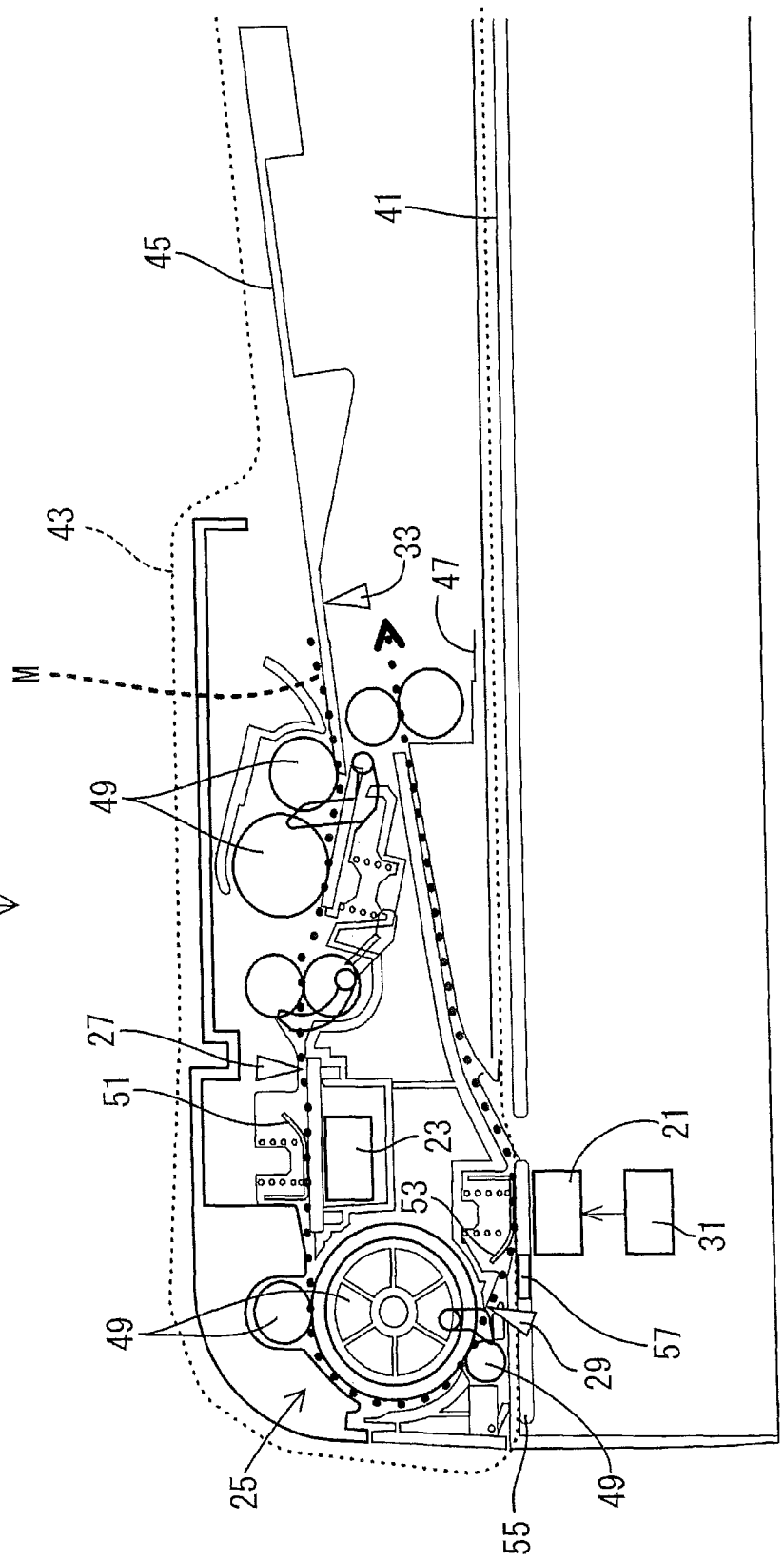
FIG. 2 is a schematic view of a scanning unit of the image reading device according to the embodiment.

FIG. 2 shows the general structure of the scanning unit 5. The MFP 1 is provided with a flatbed glass surface 41, and a cover 43. The flatbed glass surface 41 is provided in the top surface of the body of the MFP 1 constituting the printing unit 7 and the like. The cover 43 covers the flatbed glass surface 41 and can rotate open and closed on a frame portion of the flatbed glass surface 41. An ADF glass surface 55 is provided below the cover 43. The front-surface reading device 21 and moving mechanism 31 are disposed beneath the flatbed glass surface 41 and ADF glass surface 55. The back-surface reading device 23, ADF 25, first sensor 27, second sensor 29, and sheet sensor 33 are disposed inside the cover 43.

Each of the reading devices 21 and 23 includes RGB light sources 22A (light-emitting elements), an image sensor 22B (photographic element), and a light-introducing member 22C as shown in FIG. 3B. As shown in FIG. 3A, the image sensor 22B includes a plurality (12 in this example) of light-receiving chips 24 arranged linearly in the left-right direction of FIG. 3A. Each light-receiving chips 24 has a plurality of lenses 222 arranged in the left-right direction and a plurality of light-receiving elements 221 arranged in the left-right direction. The spacing of the lenses and the diameter of each lens 222 is equivalent to the layout range of a plurality (7, for example) of light-receiving elements 221. The control unit 3 transmits a clock input signal CLK and sequentially transmits a start pulse input signal SP to each of the light-receiving chips 24 and in response sequentially receives pixel row data from each light-receiving chip 24 as an electric signal $V_{out}$. In other words, the plurality of lenses 222 is arranged in a predetermined direction at a predetermined lens-to-lens distance D. The lens-to-lens distance D is a distance between centers of adjacent two lenses 222 in left-right direction. The plurality of light-receiving elements 221 is arranged in the predetermined direction at a predetermined element-to-element distance as shown in FIG. 3B. Each of the plurality of lenses 222 corresponds at least two light-receiving elements 221. Each of the light-receiving elements 221 is configured to output one pixel value based on a received light.

The cover 43 is further provided with a sheet tray 45 for supporting the sheet M, and a discharge tray 47 disposed beneath the sheet tray 45. The sheet sensor 33 is disposed near the sheet tray 45. The sheet sensor 33 functions to detect the presence of the sheet M on the sheet tray 45 and to transmit the detection results to the control unit 3. A U-shaped conveying path is formed inside the cover 43 for conveying the sheet M in a first direction from the sheet tray 45, then redirecting the sheet M back in a second opposite direction to the discharge tray 47. The ADF 25 is provided with a plurality of conveying rollers 49, and a sheet pressing member 53 disposed along the conveying path.

The back-surface reading device 23 is disposed on one side (the bottom side in FIG. 2) of the first section of the conveying path (the portion from the sheet tray 45 to the redirecting point). The back-surface reading device 23 reads an image from the back surface of the sheet M (the bottom surface of the sheet M when the sheet M is resting in the sheet tray 45) conveyed from the sheet tray 45 and transmits scan data corresponding to the back surface image to the control unit 3. The back-surface reading device 23 is immovably disposed. A back-surface white reference member 51 is disposed in a position confronting the back-surface reading device 23 across the conveying path.

The first sensor 27 is disposed on the conveying path upstream of the reading position of the back-surface reading device 23 with respect to the direction in which the sheet M is conveyed (hereinafter referred to as the "upstream side"). The first sensor 27 detects the sheet M when the sheet M nears the reading position and transmits the detection results to the control unit 3. The front-surface reading device 21 is disposed on one side (the bottom side in FIG. 2) of the second section of the conveying path (the portion leading from the redirecting point to the discharge tray 47). The front-surface reading device 21 functions to read an image from the front surface of the sheet M (the top surface of the sheet M when the sheet M is resting in the sheet tray 45) and to transmit scan data corresponding to the top surface image to the control unit 3.

The front-surface reading device 21 is movably disposed on the moving mechanism 31. That is, the moving mechanism 31 can move the front-surface reading device 21 in the left-right direction of FIG. 2 parallel to the flatbed glass surface 41 and ADF glass surface 55. A front-surface white reference member 57 is disposed on the bottom surface of the ADF glass surface 55. The region directly beneath the sheet pressing member 53 serves as the front-surface reading area when the sheet M is conveyed by the ADF 25. The moving mechanism 31 can move the front-surface reading device 21 between a position confronting the front-surface white reference member 57, a position confronting the front-surface reading area, and the region directly beneath the flatbed glass surface 41. The second sensor 29 is disposed on the upstream side of the sheet pressing member 53. The second sensor 29 detects the sheet M approaching the reading position of the front-surface reading device 21 and transmits the detection results to the control unit 3.

Scanning functions possessed by the MFP 1 include a flatbed reading function and an ADF reading function. The MFP 1 implements the flatbed reading function when the sheet sensor 33 does not detect the presence of a sheet M in the sheet tray 45, and implements the ADF reading function when the sheet sensor 33 does detect the presence of a sheet M. The flatbed reading function is used to read an image from a sheet M stationary on the flatbed glass surface 41. When implanting this function, the moving mechanism 31 moves the front-surface reading device 21 in a sub-scanning direction (from left to right in FIG. 2) directly beneath the flatbed glass surface 41, while the front-surface reading device 21 reads the image on the bottom surface of a stationary sheet M.

The ADF reading function is employed to read an image from a sheet M as the sheet M is conveyed automatically by the ADF 25. Possible ADF reading functions that can be implemented include a single-sided reading function and a double-sided reading function. In the single-sided reading function, the front-surface reading device 21 reads an image from only one surface (front surface) of the sheet M. In the double-sided reading function, the front-surface reading device 21 and back-surface reading device 23 read images from both surfaces of the sheet M simultaneously. Next, the double-sided reading function will be described using the example of the scanning process executed by the control unit 3.

Scanning Process

When the user issues a command to execute a double-sided reading function through an operation on the operating unit 11 or the input unit of an external device, the control unit 3 executes the scanning process shown in FIG. 4. Note that the control unit 3 executes this process only after determining that a sheet M is present on the sheet tray 45 based on the detection results of the sheet sensor 33.

In S1 the control unit 3 starts the ADF 25 to begin conveying the sheet M. Within the time interval that the leading edge of the sheet M is moving from the sheet tray 45 to the detection region of the first sensor 27, the control unit 3 executes a light intensity adjustment process in S2 for each of the reading devices 21 and 23 and a white reference data process in S3 (see FIG. 5) for calibrating white reference data to be used in shading compensation. In the light intensity adjustment process, the control unit 3 controls the light sources 22A in each of the reading devices 21 and 23 to emit light, and adjusts their light intensities to achieve a desired value.

Shading compensation is a process performed to correct reading errors due to sensitivity variation among the light-receiving elements 221 of the image sensor 22B possessed by each of the reading devices 21 and 23, incident light variation due to positional variation among the light-receiving elements 221, and brightness variation among the light sources 22A. Shading compensation is generally performed using the equation given below. The electric signal outputted by the image sensor 22B in response to the intensity of light received by each of the light-receiving elements 221 represents the pixel value in one of 256 levels, from 0 (black) to 255 (white).

Corrected pixel row data=[(uncorrected pixel row data−black reference data)/(white reference data−black reference data)]×255

The control unit 3 acquires the black reference data for each of the RGB colors in a process performed prior to the light intensity adjustment process, for example. In this process, pixel row data is received from the image sensor 22B during a dark state in which the light sources 22A are extinguished.

Figure 5:
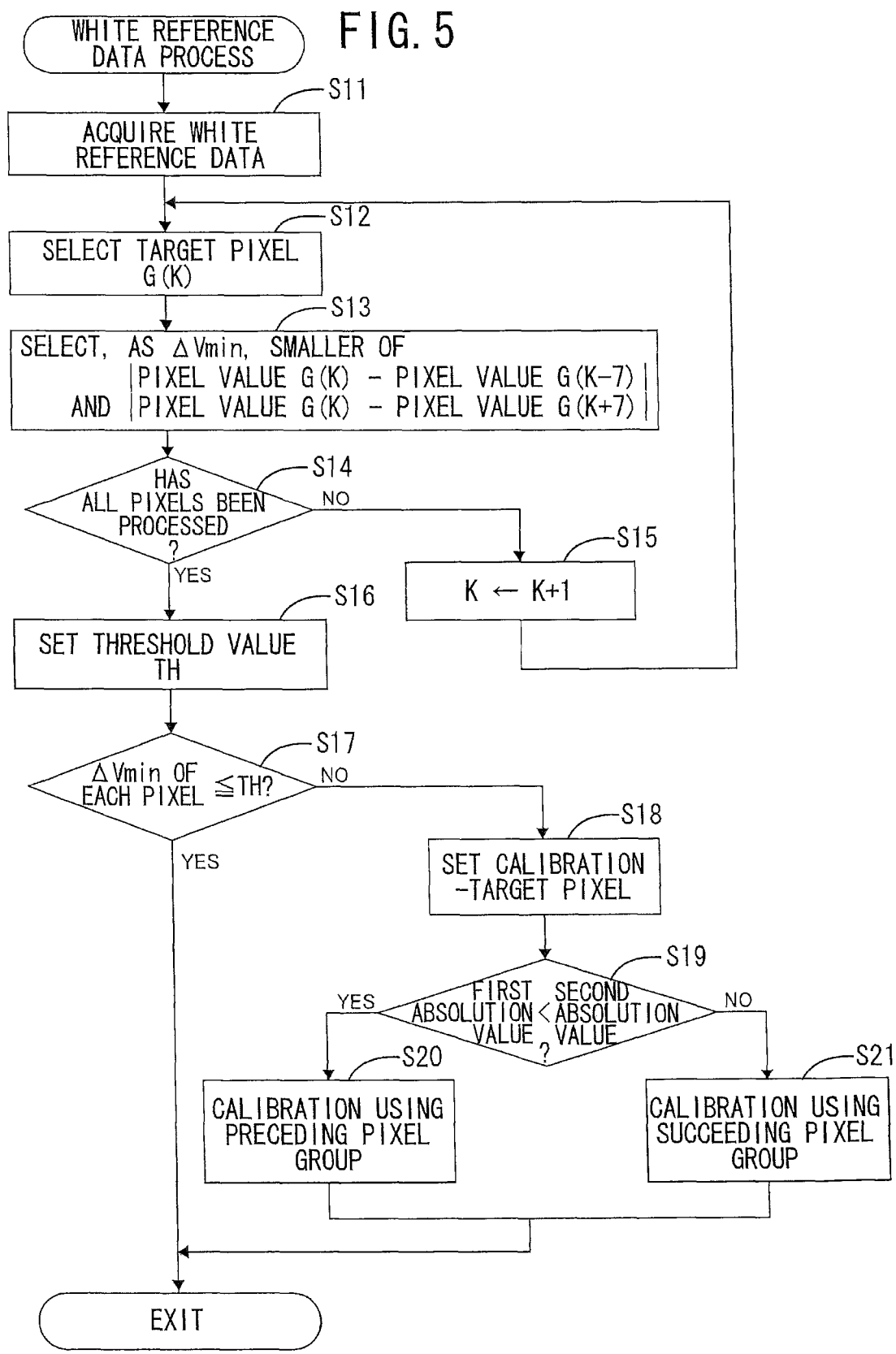
FIG. 5 is a flowchart illustrating steps in a white reference data process in the scanning process of FIG. 4.

FIG. 5 illustrates steps in the white reference data process of S3. In S11 of FIG. 5, the control unit 3 executes a data acquisition process for each of the reading devices 21 and 23 to acquire white reference data for the RGB colors. Specifically, the control unit 3 controls the image sensor 22B of the respective reading devices 21 and 23 to read the corresponding white reference members 51 and 57 while the RGB light sources 22A are all turned on, and receives the resulting pixel row data. The white reference data is acquired based on a light reflected from the white reference member and includes a plurality of pixel values for a plurality of pixel. Each of light-receiving elements 221 receives the light reflected from the white reference member and passing through the corresponding lens 222 and outputs a pixel value based on the received reflected light.

(1) Detection of Abnormal Pixels

Figure 6:
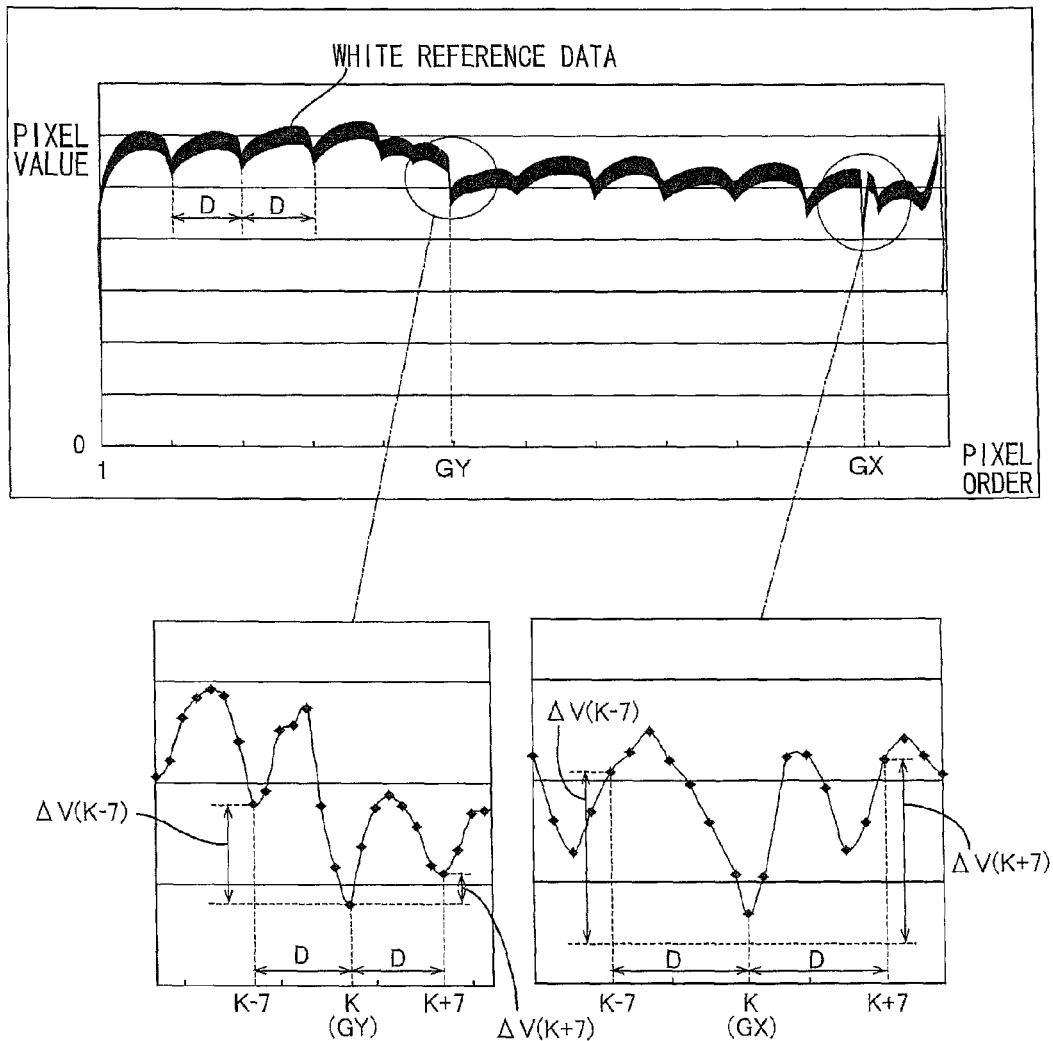
FIG. 6 is a graph showing relationships between pixel values in white reference data and positions of pixels.

FIG. 6 shows an example of white reference data acquired in S11. In FIG. 6 the vertical axis of each graph indicates the pixel value, while the horizontal axis indicates the order (position) of each pixel. In the following description, a pixel positioned on the left side of another pixel in the graph will be called a preceding pixel, while a pixel positioned to the right side of another pixel will be called a succeeding pixel.

Occasionally, foreign matter becomes deposited on one of the reading devices 21 and 23 or the white reference members 51 and 57. There is a higher probability of foreign matter being present on the back-surface reading device 23 and the back-surface white reference member 51 for the following reason. When a sheet of a sheet M becomes jammed on the conveying path of the scanning unit 5, the operator must open the cover 43 to remove the jammed sheet. When the cover 43 is open, the back-surface reading device 23 and back-surface white reference member 51 are exposed to foreign matter and susceptible to contact by the user.

When foreign matter is present, the pixel values outputted by light-receiving elements 221 detecting light intensity in the region of the foreign matter deviate greatly from the values of preceding and succeeding pixels. GX in the top graph of FIG. 6 denotes a foreign matter pixel corresponding to the position of foreign matter present in the reading device 21 or 23. As shown in the enlarged graph in the lower right of FIG. 6, the value of the foreign matter pixel GX is much lower than that of the preceding and succeeding pixels.

However, foreign matter is not the only cause of fluctuations in pixel values found in white reference data. Pixel values in white reference data may also fluctuate due to periodic changes corresponding to the lens spacing, inter-chip output level discrepancies, and the like. As described earlier, the lenses 221 in the image sensor 22B are spaced at intervals of seven pixels. Hence, the white reference data changes in cycles of seven pixels. This is indicated in FIG. 6 as an interval D corresponding to the lens spacing (lens-to-lens distance D). The pixel values for every seven-pixel group vary in an arc-shape, as shown in FIG. 6, owing to the focusing properties of the lenses 221.

As described above, the image sensor 22B has a plurality of light-receiving chips 24 arranged linearly. Therefore, differences among the light-receiving chips 24, such as their photoelectric conversion properties, can be used to determine the overall difference between the values of a pixel group corresponding to a first light-receiving chip 24 and the values of a pixel group corresponding to a second light-receiving chip 24 adjacent to the first light-receiving chip 24. This overall difference produces a difference in level between the value of a pixel corresponding to the light-receiving element on the end of the first light-receiving chip 24 and the value of an adjacent pixel corresponding to the light-receiving element at the beginning of the second light-receiving chip 24. This jump in pixel values will be called an inter-chip output level difference. As shown in the enlarged graph at the bottom left of FIG. 6, the inter-chip output level difference results in a pixel GY with an irregular pixel value. However, it is preferable that this pixel not be considered an abnormal pixel since the value of the pixel is affected by periodic changes due to lens spacing or inter-chip output level differences and can be corrected through shading compensation.

Therefore, in S12-S17 the control unit 3 executes an abnormal pixel determination process based on the white reference data. The control unit 3 sets each pixel in the pixel row as the target pixel and determines that the target pixel is an abnormal pixel when the absolute value of the difference between the value of the target pixel and the value of a contrast pixel separated from the target pixel by an integer multiple of the interval D is greater than a prescribed threshold TH. Specifically, the contrast pixel corresponds to a light-receiving element that is separated from a light-receiving element corresponding to the target pixel by an integer multiple of the predetermined lens-to-lens distance D. In the following example, the contrast pixel will be the pixel separated from the target pixel by the interval D, i.e., the seventh pixel from the target pixel.

Specifically, in S12 the control unit 3 sequentially selects each pixel in the white reference data as the target pixel G(K). In S13 the control unit 3 extracts a preceding contrast pixel G(K−7), which is positioned seven pixels before (upstream of) the target pixel G(K), and calculates a first absolute value $\Delta V(K-7)$ by taking the difference in the values of the target pixel G(K) and the preceding contrast pixel G(K−7). The control unit 3 also extracts a succeeding contrast pixel G(K+7), which is positioned seven pixels after (downstream of) the target pixel G(K), and calculates a second absolute value $\Delta V(K+7)$ by taking the difference in the values of the target pixel G(K) and the succeeding contrast pixel G(K+7). Next, the control unit 3 sets the smaller of the first absolute value $\Delta V(K-7)$ and second absolute value $\Delta V(K+7)$ as a selection value $\Delta V_{min}$.

In S14 the control unit 3 determines whether the process of S13 has been performed for all pixels. While there remain pixels that have not undergone the process in S13 (S14: NO), in S15 the control unit 3 increments the pixel position K by "1" and returns to S12 to repeat the above process. When the process of S13 has been performed for all pixels (S14: YES), the control unit 3 advances to S16. Note that the term "all pixels" in this case does not signify all pixels in the white reference data. At least a group of six pixels at the very beginning of the white reference data and a group of six pixels at the very end of the white reference data are dummy pixels and are not used in the scanned image and are thus not chosen as target pixels for the process of S13.

In S16 the control unit 3 performs a process to set the threshold value. Specifically, the control unit 3 and threshold setting unit calculates the standard deviation of the selection value $\Delta V_{min}$ when each pixel is set as the target pixel G(K), and sets the threshold TH to the product of this standard deviation and a predetermined constant. This method can set the threshold TH to a value proportionate to the pixel values in the pixel row, even when the values fluctuate due to changes in ambient conditions.

Accordingly, this method can minimize the effects of environmental changes, unlike when the threshold value is set to a fixed value.

After executing the threshold setting process, in S17 the control unit 3 compares the selection value for each pixel to the threshold TH. If the selection value $\Delta V_{min}$ is less than or equal to the threshold TH for all pixels (S17: YES), then the control unit 3 determines that there are no abnormal pixels in the white reference data, ends the current white reference data process without performing a calibration process, and advances to S4 of FIG. 4. However, if the selection value $\Delta V_{min}$ exceeds the threshold TH for any of the pixels (S17: NO), the control unit 3 determines that an abnormal pixel exists in the white reference data and executes the calibration process of S18-S21.

As described above, the contrast pixels G(K−7) and G(K+7) are separated the interval D from the target pixel G(K), wherein the interval D corresponds to the lens spacing. Therefore, the values of the target pixel G(K) and the contrast pixels G(K−7) and G(K+7) are not influenced by the periodic changes in pixel values corresponding to the lens spacing. Further, as indicated in the lower right graph of FIG. 6, the pixel values in the pixel group preceding the foreign matter pixel GX and the pixel group succeeding the foreign matter pixel GX are higher overall than the value of the foreign matter pixel GX. Accordingly, since the first absolute value $\Delta V(K-7)$ and the second absolute value $\Delta V(K+7)$ are both relatively high, in S17 the control unit 3 determines that the selection value $\Delta V_{min}$ exceeds the threshold TH (S17: NO), enabling the control unit 3 to determine that the foreign matter pixel GX is an abnormal pixel.

In the lower left graph of FIG. 6, on the other hand, only the values in the pixel group preceding the pixel GY are higher overall than the value of the pixel GY, while pixel values in the succeeding group are relatively near the value of the pixel GY. In other words, the pixel GY is near almost all values in the succeeding group and not near the values in the preceding group. Accordingly, since the second absolute value $\Delta V(K+7)$ is smaller than the first absolute value $\Delta V(K-7)$, in S17 the control unit 3 determines that the change in selection value $\Delta V_{min}$ is no greater than the threshold TH (S17: YES), enabling the control unit 3 to determine that the pixel GY is not an abnormal pixel.

(2) Calibration of Abnormal Pixels

FIGS. 7 and 8 show an example of partial white reference data acquired in S11 of FIG. 5 that includes four foreign matter pixels GX(M)-GX(M+3). Upon determining that the white reference data contains abnormal pixels, in S18 the control unit 3 sets the abnormal pixels and pixels within a predetermined reference range from the abnormal pixels as calibration-target pixels. As is clear from FIGS. 6 through 8, pixels affected by the presence of foreign matter are not limited to the foreign matter pixels GX determined to be the abnormal pixels, but include peripheral pixels of the foreign matter pixels GX, which have lower pixel values. Therefore, in addition to the foreign matter pixels GX (G(M)-G(M+3)), the control unit 3 also sets the three pixels GH (G(M−3)-G(M−1)) preceding the foreign matter pixels GX and the three pixels GH (G(M+4)-G(M+6)) succeeding the foreign matter pixels GX as calibration-target pixels, for example, as shown in FIG. 8. This method of calibration covers the entire region affected by the foreign matter better than a method of calibrating only the abnormal pixels.

After establishing the calibration target pixels, the control unit 3 determines which region of pixels to use for calibration. Specifically, in S19 the control unit 3 calculates the first and second absolute values and determines whether the first absolute value is smaller than the second absolute value for the abnormal pixel. If the first absolute value is smaller than the second absolute value (S19: YES), in S20 the control unit 3 sets the pixel group preceding the abnormal pixel as the group to be used for calibration. If the second absolute value is smaller than the first absolute value (S19: NO), in S21 the control unit 3 sets the pixel group succeeding the abnormal pixel as the group to be used for calibration. When there is a plurality of abnormal pixels, as in the example of FIGS. 7 and 8, the control unit 3 preferably compares the average first absolute value and the average second absolute value for all abnormal pixels to set the region to be used for calibration.

That is, the control unit 3 calculates a first average value by averaging first absolute values $\Delta V(M-7)$-$\Delta V(M-4)$ and calculates a second average value by averaging second absolute values $\Delta V(M+7)$-$\Delta V(M+10)$. Next, the control unit 3 compares the first average value to the second average value. Since the second average value is smaller than the first average value in the example of FIGS. 7 and 8 (top graph), the control unit 3 selects the pixel group succeeding the abnormal pixel to be used for calibration.

After setting the group of pixels to be used for calibration, the control unit 3 performs a calibration process to calibrate the value of each calibration-target pixel based on the average value of the plurality of pixels belonging to the group selected to be used for calibration that are separated from the calibration target pixel by an integer multiple of the interval D. For example, when calibrating the values of the calibration-target pixel G(M), the control unit 3 extracts the pixels G(M+14) and G(M+21) separated distances 2D and 3D from the calibration-target pixel G(M) and sets the pixel value for the calibration-target pixel G(M) to the average value of the pixels G(M+14) and G(M+21), as illustrated in the bottom graph of FIG. 8. By calibrating the value of an abnormal pixel based on a plurality of pixel values in this way, the control unit 3 can more reliably minimize the effects of variations in focusing properties of lenses and the like more than a method of calibration based on a single pixel value.

After completing the white reference data process, in S4 the control unit 3 controls the reading devices 21 and 23 to execute a double-sided reading operating. More specifically, the control unit 3 controls the back-surface reading device 23 to execute a reading operation based on the timing at which the first sensor 27 detects the sheet M and controls the front-surface reading device 21 to perform a reading operation based on the timing at which the second sensor 29 detects the sheet M. The control unit 3 also performs shading compensation on the scan data read in the double-sided reading operation using the white reference data acquired in the white reference data process. After completing the double-sided reading operation, in S5 the control unit 3 halts the ADF 25 to convey the sheet M and ends the current scanning process.

Effects of the Embodiment

In the embodiment described above, the MFP 1 determines that a target pixel is an abnormal pixel when the absolute value of the difference between the values of the target pixel and a contrast pixel exceed a threshold value, where the contrast pixel is a pixel corresponding to a light-receiving element 221 separated from the target pixel by an integer multiple of the lens spacing (lens-to-lens distance D). Compared to the conventional configuration of setting the contrast pixel to a pixel corresponding to a light-receiving element 221 separated from the light-receiving element 221 corresponding to the target pixel by a distance different from an integer multiple of the lens spacing D, the configuration of the embodiment can better determine abnormal pixels while minimizing the effects of periodic changes corresponding to the lens spacing that are inherent in white reference data.

Reference Example

The following technique is a reference example related to the present invention. The detailed structures of components in the reference example are identical to those in the embodiment described above. Further, the reading device in this technology does not include a plurality of lenses having the same diameter and, hence, has a structure unaffected by periodic changes corresponding to the lens spacing. Compared to the conventional image-reading device that averages the values of preceding and succeeding pixels, the configuration of the reference example can minimize cases in which pixels affected by inter-chip output level differences and the like are incorrectly determined to be abnormal pixels.

While the invention has been described in detail with reference to the embodiments thereof, it would be apparent to those skilled in the art that various changes and modifications may be made therein without departing from the spirit of the invention.

In the above-described embodiment, the MFP 1 is given as an example of the image-reading device. However, the image-reading device of the present invention may be a standalone scanning device.

In the above-described embodiment, an image sensor 22B having a plurality of light-receiving chips 24 arranged linearly is given as an example of the light-receiving unit. However, the light-receiving unit of the present invention may be configured of a single light-receiving chip. Although inter-chip output level differences are not a problem with this configuration, the structure can determine abnormal pixels while minimizing the effects of periodic changes in pixel values corresponding to the lens spacing that are inherent in white reference data.

In the above-described embodiment, the control unit 3 is provided with a single CPU for executing the scanning process. However, the control unit 3 may be configured to execute the scanning process with a plurality of CPUs, a hardware circuit such as an application-specific integrated circuit (ASIC), or both a hardware circuit and CPU. For example, the control unit 3 may be configured to execute at least two of the data acquisition process, abnormal pixel determination process, threshold setting process, and calibration process separately with a CPU and a hardware circuit.

In the threshold setting process of the embodiment described above, the control unit 3 sets the threshold TH to a value proportionate to the standard deviation of the selection value $\Delta V_{min}$, i.e., the smallest of the first absolute value $\Delta V(K-7)$ and the second absolute value $\Delta V(K+7)$. However, the control unit 3 instead may be configured to set the threshold TH to a value proportionate to the standard deviation of the larger of the first absolute value $\Delta V(K-7)$ and the second absolute value $\Delta V(K+7)$. However, the method described in the embodiment can set a threshold TH that minimizes the effects of inter-chip output level differences. Alternatively, rather than using the standard deviation of the selection value $\Delta V_{min}$, the control unit 3 may set the threshold TH to an average value or a median value.

In the above-described embodiment, the control unit 3 calibrates the value of the calibration-target pixel to the average value of a plurality of pixels separated from the calibration-target pixel by an integer multiple of the interval D. However, the control unit 3 instead may calibrate the value of the calibration-target pixel to the value of a single pixel or the median value between the minimum and maximum values of the plurality of pixels. Further, in the above-described embodiment, the control unit 3 does not use the value of the contrast pixel used for determining the abnormal pixel (S13, S17) in the calibration process, but the control unit 3 may use the value of the contrast pixel in the calibration process. However, using different pixels for the process to determine abnormal pixels and the process to calibrate abnormal pixels can minimize the possibility of both processes being affected by a specific pixel, which can occur when a common pixel is used in both processes.

What is claimed is:

1. An image reading device comprising:
a white reference member;
a reading device including a plurality of lenses and a plurality of light-receiving elements, the plurality of lenses being arranged in a predetermined direction at a predetermined lens-to-lens distance, each of the plurality of lenses having a predetermined diameter, the plurality of light-receiving elements being arranged in the predetermined direction, the plurality of light-receiving elements being configured to output white reference data including a plurality of pixel values for a plurality of pixels based on a light reflected from the white reference member, each of the plurality of lenses corresponding to at least two of the plurality of light-receiving elements, each of the plurality of light-receiving elements being configured to receive a light reflected from the white reference member and passing through the corresponding lens and to output one of the plurality pixel values based on the received reflected light; and
a processor configured to:
acquire the white reference data by using the reading device;
set each of the plurality of pixels as a target pixel; and
determine that the target pixel is an abnormal pixel when an absolute value of difference between a pixel value of the target pixel and a pixel value of a first pixel is greater than a prescribed threshold, the first pixel corresponding to a light-receiving element that is separated from a light-receiving element corresponding to the target pixel by an integer multiple of the predetermined lens-to-lens distance.

2. The image reading device according to claim 1, wherein the reading device includes a plurality of light-receiving chips arranged in the predetermined direction, each of the plurality of light-receiving chips being provided with the at least two of the plurality of light-receiving elements;
wherein the processor is further configured to:
calculate a first absolute value of difference between the pixel value of the target pixel and a pixel value of a preceding first pixel, the preceding first pixel being a first pixel corresponding to a light-receiving element positioned upstream of the light-receiving element corresponding to the target pixel in the predetermined direction; and
calculate a second absolute value of difference between the pixel value of the target pixel and a pixel value of a succeeding first pixel, the succeeding first pixel being a first pixel corresponding to a light-receiving element positioned downstream of the light-receiving element corresponding to the target pixel in the predetermined direction;
wherein the process or determines that the target pixel is the abnormal pixel when the first absolute value or the second absolute value, whichever is smaller, is greater than the prescribed threshold.

3. The image reading device according to claim 2, wherein the processor is further configured to calibrate the pixel value of target pixel based on a plurality of first pixels corresponding to light-receiving elements each separated from the light-receiving element corresponding to the target pixel by an integer multiple of the predetermined lens-to-lens distance when the determining unit determines that the target pixel is the abnormal pixel.

4. The image reading device according to claim 1, wherein the processor is further configured to:
calculate a standard deviation of a plurality of absolute values of difference between the pixel value of the target pixel and a pixel value of each of a plurality of first pixels; and
set the prescribed threshold to a value proportionate to the standard deviation.

5. The image reading device according to claim 1, wherein the processor is further configured to:
set, as calibration-target pixels, the abnormal pixel and pixels positioned within a predetermined range from the abnormal pixels; and
calibrate a pixel value of each of the calibration target pixels.

6. The image reading device according to claim 1, wherein the processor is further configured to:
calculate a first absolute value of difference between the pixel value of the target pixel and a pixel value of a preceding first pixel when the target pixel is the abnormal pixel, the preceding first pixel being a first pixel and positioned upstream of the target pixel in the predetermined direction;
calculate a second absolute value of difference between the pixel value of the target pixel and a pixel value of a succeeding first pixel when the target pixel is the abnormal pixel, the succeeding first pixel being a first pixel and positioned downstream of the target pixel in the predetermined direction; and
calibrate the pixel value of the target pixel based on the pixel values of the preceding first pixels when the first absolute value is smaller than the second absolute value, the pixel value of the target pixel being calibrated based on the pixel value of the succeeding first pixels when the second absolute value is smaller than the first absolute value.

7. The image reading device according to claim 1, wherein the reading device is further configured to output read image data including a plurality of read pixel values based on a light reflected from a sheet, each of the plurality of light-receiving elements being further configured to receive the light reflected from the sheet and passing through the corresponding lens and to output one of the plurality read pixel values based on the received reflected light.

8. A non-transitory computer readable storage medium storing a set of program instructions installed on and executed by a computer, the program instructions comprising:
acquiring white reference data outputted by a plurality of light-receiving elements of a reading device, the reading device including a plurality of lenses and a plurality of light-receiving elements, the plurality of lenses being arranged in a predetermined direction at a predetermined lens-to-lens distance, each of the plurality of lenses having a predetermined diameter, the plurality of light-receiving elements being arranged in the predetermined direction, the white reference data including a plurality of pixel values for a plurality of pixels based on a light reflected from a white reference member, each of the plurality of lenses corresponding to at least two of the plurality of light-receiving elements, each of the plurality of light-receiving elements being configured to receive a light reflected from the white reference member and passing through the corresponding lens and to output one of the plurality pixel values based on the received reflected light;
setting each of the plurality of pixels as a target pixel; and
determining that the target pixel is an abnormal pixel when an absolute value of difference between a pixel value of the target pixel and a pixel value of a first pixel is greater than a prescribed threshold, the first pixel corresponding to a light-receiving element that is separated from a light-receiving element corresponding to the target pixel by an integer multiple of the predetermined lens-to-lens distance.

* * * * *